No. 880,267. PATENTED FEB. 25, 1908.
J. U. BAKER.
POWER TRANSMISSION MECHANISM.
APPLICATION FILED JULY 19, 1907.

2 SHEETS—SHEET 1.

Witnesses
Carl Stoughton
Frank J. Campbell

Inventor
Jonathan U. Baker
By Chester C. Shepherd
Attorney

No. 880,267. PATENTED FEB. 25, 1908.
J. U. BAKER.
POWER TRANSMISSION MECHANISM.
APPLICATION FILED JULY 19, 1907.

2 SHEETS—SHEET 2.

Witnesses
Carl Stoughton
Frank G. Campbell

Inventor
Jonathan U. Baker
By
Chester C. Shepherd
Attorney

UNITED STATES PATENT OFFICE.

JONATHAN U. BAKER, OF STOUTSVILLE, OHIO.

POWER-TRANSMISSION MECHANISM.

No. 880,267.  Specification of Letters Patent.  Patented Feb. 25, 1908.

Application filed July 19, 1907. Serial No. 384,558.

*To all whom it may concern:*

Be it known that I, JONATHAN U. BAKER, citizen of the United States, residing at Stoutsville, in the county of Fairfield and State of Ohio, have invented certain new and useful Improvements in Power-Transmission Mechanism, of which the following is a specification.

My invention relates to transmission mechanism particularly adapted for use upon automobiles, though it may be used for other purposes if desired, the object of the invention being to provide a device of this character by means of which motion at high speed, low speed or in a reverse direction may be imparted to a driven shaft, while the driving or engine shaft continues to rotate at a uniform speed in one direction.

Further objects and advantages of the invention will be set forth in the detailed description which now follows.

Figure 1:
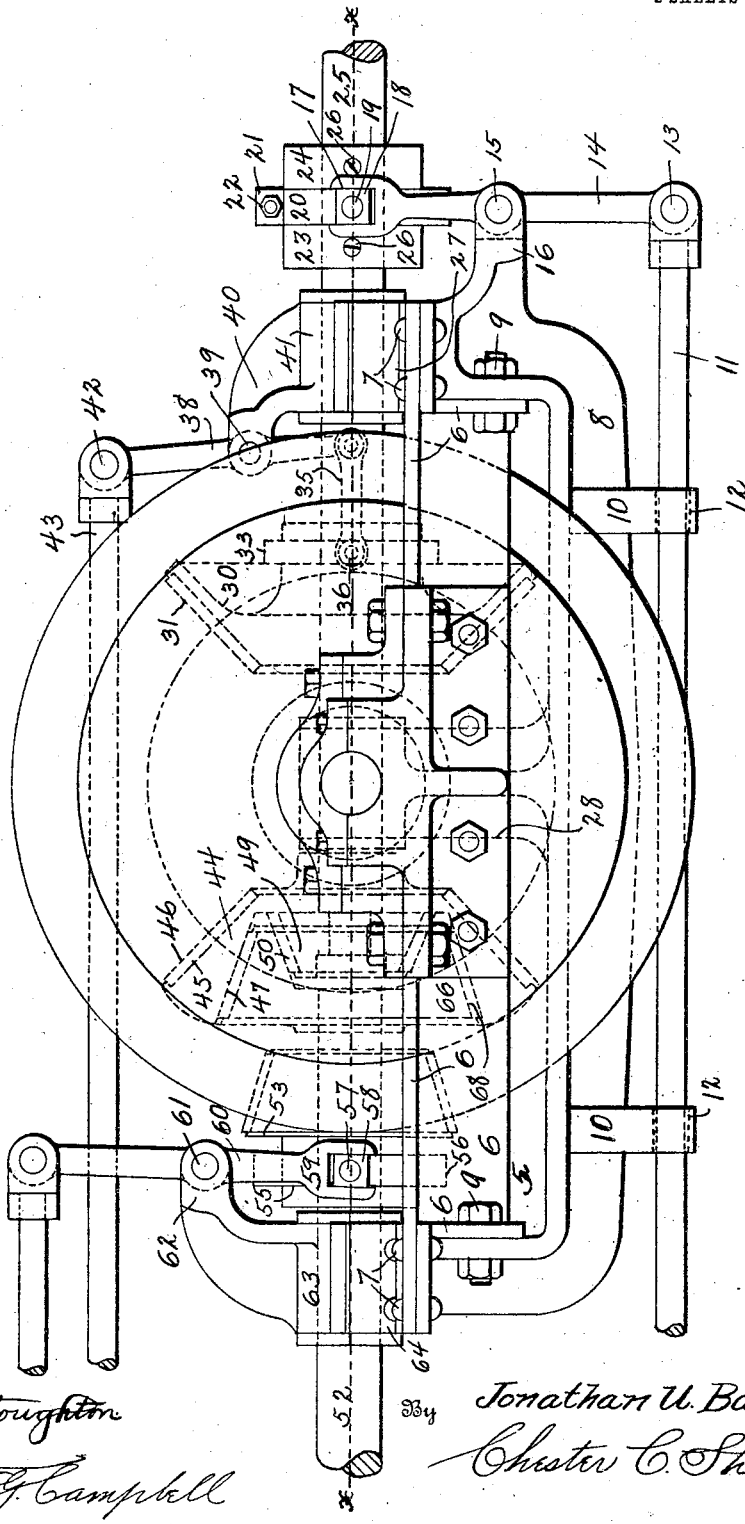
Figure 2:
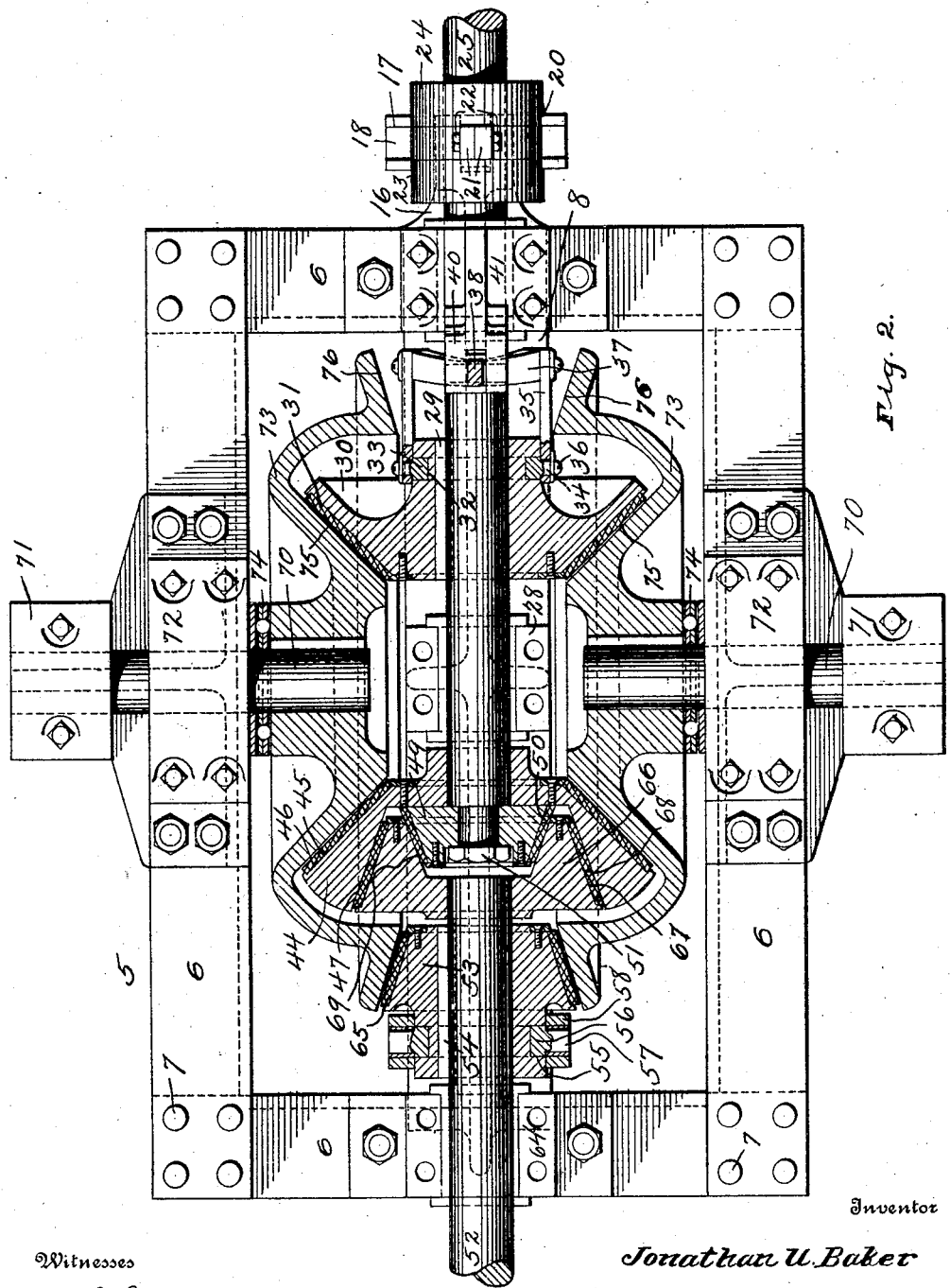

In the accompanying drawings: Figure 1 is a side elevation of a transmission gearing constructed in accordance with the invention, and Fig. 2 is a horizontal section upon line $x$—$x$ of Fig. 1.

Like numerals designate corresponding parts in both of the figures of the drawing.

Referring to the drawing, 5 designates a preferably rectangular supporting frame which is composed of angle plates 6, said angle plates being riveted to each other as at 7. A longitudinally extending and centrally disposed bracket 8 is bolted to the end plates 6 of the frame 5 by nuts and bolts 9. This bracket 8 has hangers 10 depending therefrom and a controlling rod 11 is slidably disposed in openings 12 of these brackets. These openings are slightly larger than the rod. At its outer end this rod is pivotally connected as at 13 to a lever 14, said lever being in turn pivoted at 15 in an extension 16 of the bracket 8. At its upper end this lever is forked and the forked portions of the lever are bifurcated as at 17 for the reception of blocks 18, these blocks surrounding pins 19 which are carried by a split ring 20. This ring is provided with upstanding ears 21 which are adapted to be clamped together by a nut and bolt 22. This ring when clamped in this position, lies between collars 23 and 24 which are fixed to a driven shaft 25 by set screws 26. It is to be understood that this driven shaft may be connected to the axle of an automobile or other device to be driven at varying speeds in any desired manner. This driven shaft is slidably disposed in a bearing 27 supported by the frame 5 and in a second bearing 28 which extends upwardly from the bracket 8.

Splined upon the shaft 25 by a feather key 29, is a friction cone 30, the periphery or outer working face of which is covered by leather, fiber or other suitable frictional material indicated at 31. The hub of this cone is recessed as at 32 for the reception of a ring 33. This ring carries pins 34 and the inner ends of links 35 engage these pins and are held in engagement therewith by set screws 36. The outer ends of these links are secured to a block 37 and the lower end of a lever 38 carries this block. This lever is pivoted as at 39 in an extension 40 of a bearing cap 41 which forms a portion of the bearing 28. At its upper end the lever 38 is pivotally connected as at 42 to a controlling rod 43.

Upon the inner end of the driven shaft 25, a friction cup cone 44 is secured. This cup cone has an outer working face 45 which is covered by frictional material 46 and an inner working face 47. Clamped upon the inner reduced end of the shaft 25 is a second cone 49, the outer surface of which is covered by fractional material 50. A nut 51 holds the cone 49 in position.

A driving shaft 52 to which motion may be imparted by an engine in the usual and well known manner, has a friction cone 53 splined thereon by a feather key 54. The hub of this cone is recessed as at 55 for the reception of a ring 56 said ring carrying pins 57 which are surrounded by blocks 58 said blocks in turn being engaged by the forked ends 59 of a lever 60. This lever is pivoted as at 61 in an extension 62 of a bearing cap 63, said bearing cap, together with a second bearing cap 64, forming a bearing for the shaft 52. Friction material 65 such as fiber, leather or the like, covers the face of the cone 53. Fixedly mounted upon the extreme inner end of the shaft 52 is a second friction cup cone 66. This cup cone has an outer working face 67 which is covered by friction material 68 and an inner working face 69 which is at certain times engaged by the frictional material 50 of the cone 49.

Jack shafts 70 are mounted in bearings 71 and 72 and friction disks 73 are keyed upon the inner ends of these jack shafts. Anti-friction devices 74 are preferably arranged between the hubs of these friction disks and the bearings 72, though these anti-friction devices may be dispensed with if desired. The friction cones 73 each have two working faces 75 and 76.

The operation of the device is as follows: When it is desired to drive the shaft 25 at high speed, the rod 11 is shifted to the right in Fig. 1. This slides the shaft 25 bodily to the left through the connections described and throws the working surface of the cone 49 into engagement with the working face 69 of the cone 66. It also throws the working surface 47 of the cup cone 44 into engagement with the outer working face of the cone 66. This results in locking the engine shaft 52 to the driven shaft 25 and the shaft 25 will then rotate with the engine shaft and at the same rate of speed as the engine shaft.

When it is desired to run the driven shaft 25 at a low speed, the rod 11 is actuated to move the shaft 25 enough to throw the cones 49 and 44 out of engagement with the cone 66 and at the same time throw the outer working face of the cup cone 44 into engagement with the working faces 75 of the disks 73. This connects the disks to the driven shaft 25 through the cup cone 44. The lever 60 is now shifted through the medium of a rod 80 to throw the frictional material 65 which covers the working face of the cone 53 into engagement with the working faces 76 of the disks 73, thereby imparting rotation to said disks, but since said disks are so much larger than the cone 53, it follows that their revolutions per minute will be considerably less than those of said cone. The movements of the disks 73 will be imparted to the driven shaft 25 through the cup cone 44, as will be readily understood, the comparative sizes of the parts being such that the cup cone will rotate once during one revolution of the disks. When this cup cone 44 is in engagement with the disks, it is apparent that no rotation will be imparted thereto unless the cone 53 is in engagement with the disks. If, therefore, the mechanism and the shaft 25 is to be stopped, it is only necessary to throw the cone 53 out of engagement with the disks 73 through the connections described.

If it be desired to reverse the direction of rotation of the shaft 25, said shaft is moved to such a position that the cup cone 44 does not engage either with the disks or with the cone 66. The lever 43 is then actuated to move the cone 30 through the connections described, into such position that its frictional working face 31 is brought into engagement with the working face 75 of the disks. It will be understood that at this time, the cone 53 will be in engagement with the disks and that rotation will be imparted to the disks by said cone. The movement of the cone 30 may be accomplished either by a hand lever or by a foot lever (not shown), and this cone may be brought into engagement with the working surfaces 75 of the disks gradually that there may be such slipping of the members with relation to each other, as to start the shaft 25 into the reverse, very slowly. It will be seen that when the reverse cone 30 is thrown into engagement with the disks, that said disks will be rotating at the same rate of speed at which they rotate when the machine is on the slow speed forward.

I prefer to construct the disks 73 of aluminium alloy, that is, a material composed of aluminium alloyed with copper or nickel, by virtue of which these parts are not only rendered very light, but their working surfaces are frictional to such an extent as to provide an efficient gripping between themselves and the parts with which they are brought into contact. It is to be understood, however, that I do not limit myself to disks constructed of this material, but that they may be made of any material suitable for the purposes sought.

It will be noted that while the driving members herein shown and described are frictional driving members, they present substantially such inclined engaging surfaces as would be presented by beveled gears of a corresponding size. It has been found that where a flat friction pulley is brought into engagement with a friction disk or plate, that a certain torsional strain is brought upon the parts, by reason of the fact that the two surfaces are moving in different directions even while they are in engagement with each other. But in a device constructed in the manner herein shown and described, the parts that are actually in contact with each other are moving in the same direction during the period of contact, and there is consequently none of this torsional strain. In other words, these friction members are constructed upon the rules of bevel gear construction and the same freedom from torsional twist or strain is had as in a bevel gear construction. There is furthermore no tendency for the driving or driven shafts to be forced out of proper alinement, it being apparent that the pressure will be equalized by reason of the fact that the cones are in engagement with driving members upon each side thereof.

When the cup cone 44 is shifted to the left in Fig. 2, it may be shifted so gradually that it is not immediately locked to the cone 49, but upon the contrary the driven shaft will begin to turn slowly at first and its rotation will increase as the driven parts gather momentum and as the cones 44 and 49 are brought closer together, until finally these parts are locked together and rotate together at the same rate of speed. It will therefore be seen that an automobile equipped with this transmission gearing may be brought from a stand-still to high speed, by the actuation of the rod 11.

By having the driving and the driven shaft lie in longitudinal alinement with each other and by mounting the friction cones upon the ends of these shafts in the manner set forth, the slipping permitted between the parts as they are brought together, does not injure the driving surfaces for the reason that their true circular form will be preserved since the strain or wear is uniform upon all parts of the surfaces brought together.

It is apparent that by permitting these frictional driving parts to slip with relation to each other, a variable speed forward or in a reverse direction may be attained. If for instance the cone 44 is in engagement with the disks, to secure a low speed and the disk 53 be then brought gradually into engagement with the friction disks to permit an initial slipping of said cone with relation to the disks, a speed even lower than the positive low speed drive may be had. In fact, any speed between a positive low speed drive and a stand-still may be attained. The same thing is true when the reverse cone 30 is in engagement with the disks, as will be readily apparent.

It is apparent that when the shafts 52 and 25 are locked together by the cup cone 44 and the cone 66, the cone 53 may be moved out of engagement with the disks and the disks will then remain at rest, all of the friction cones rotating idly with the shafts, thereby reducing the wear and tear upon the working surfaces and requiring less power to drive the parts. The provision of conical engaging members adapted to be thrown into engagement with one another, provides a wedge thrust that is particularly efficient in securing a positive locking engagement between the parts.

From the foregoing description, it will be seen that simple and efficient means are herein provided for accomplishing the objects set forth, but while the elements shown and described are well adapted to serve the purposes for which they are intended, it is to be understood that my invention is not limited to the precise construction set forth, but includes within its purview such changes as may be made within the scope of the appended claims.

What I claim, is:

1. In a power transmission device, the combination with a driving shaft, of a driven shaft, a friction disk mounted for rotation upon each side of said shafts, a pair of friction cones mounted to rotate with the driven shaft and adapted to engage said friction disks upon opposite sides thereof, and a friction cone rotating with the driving shaft and adapted to engage and impart rotation to said disks.

2. In a power transmission device, the combination with a driving shaft, of a driven shaft, a friction disk mounted for rotation upon each side of said shafts, a pair of friction cones mounted to rotate with the driven shaft and adapted to engage said friction disks upon opposite sides thereof, one of said friction cones being slidably mounted upon the driven shaft, and a friction cone rotating with the driving shaft and adapted to engage and impart rotation to said disks.

3. In a power transmission device, the combination with a driving shaft, of a driven shaft, said driven shaft being mounted for bodily endwise movement, a friction disk, a shaft upon which said friction disk is mounted, said shaft lying substantially at right angles to the driven shaft, interlocking members carried upon the adjacent ends of the driving and the driven shaft and adapted to be brought into engagement with each other by endwise movement of said shaft, the interlocking member of the driven shaft being adapted to frictionally engage a friction surface of said disk, and a friction cone rotating with the driving shaft and adapted to engage and impart rotation to said disks.

4. In a power transmission device, the combination with a driving shaft, of a driven shaft, said driven shaft being mounted for bodily endwise movement, a friction disk, a shaft upon which said friction disk is mounted, said shaft lying substantially at right angles to the driven shaft, interlocking members carried upon the adjacent ends of the driving and the driven shaft and adapted to be brought into engagement with each other by endwise movement of said shaft, the interlocking member of the driven shaft being adapted to frictionally engage a friction surface of said disk, a friction cone mounted to turn with the driven shaft and located upon the opposite side of the friction disk from said interlocking member and a friction cone rotating with the driving shaft and adapted to engage and impart rotation to said disks.

5. In a power transmission device, the combination with a driving shaft, of a driven shaft, said driven shaft being mounted for bodily endwise movement, a friction disk, a shaft upon which said friction disk is mounted, said shaft lying substantially at right angles to the driven shaft, interlocking members carried upon the adjacent ends of the driving and the driven shaft and adapted to be brought into engagement with each other by endwise movement of said shaft, the interlocking member of the driven shaft being adapted to frictionally engage a friction surface of said disk, a friction cone mounted to turn with the driven shaft and located upon the opposite side of the friction disk from said interlocking member, said cone being mounted for sliding movement upon the driven shaft and a friction cone rotating with the driving shaft and adapted to engage and impart rotation to said disks.

6. In a power transmission device, the combination with a driven shaft, of a driving shaft, one of said shafts being mounted for bodily endwise movement with relation to the other of said shafts, a cup cone fixed upon the end of the movable shaft and having an outer friction surface and an inner friction surface, a friction disk located upon each side of said cup cone, each of said friction disks being provided with a friction surface adapted to be engaged by the outer friction surface of the cup cone, a member mounted upon the driving shaft and adapted to engage the inner friction surface of the cup cone and a friction cone rotating with the driving shaft, and adapted to engage and impart rotation to said disks.

7. In a power transmission device, the combination with a driven shaft, of a driving shaft, one of said shafts being mounted for bodily endwise movement with relation to the other of said shafts, a cup cone fixed upon the end of the movable shaft and having an outer friction surface and an inner friction surface, a friction disk located upon each side of said cup cone, each of said friction disks being provided with a friction surface adapted to be engaged by the outer friction surface of the cup cone, a member mounted upon the driving shaft and adapted to engage the inner friction surface of the cup cone, a second friction cone mounted upon the driven shaft upon the opposite side of the friction disks from the cup cone, means for bringing said friction cone into engagement with the friction surfaces of the disk and a friction cone rotating with the driving shaft, and adapted to engage and impart rotation to said disks.

8. In a power transmission device, the combination with a driven shaft, of a driving shaft, a friction disk mounted for rotation upon each side of the driven shaft, each of said friction disks having an inner friction face and an outer friction face, a pair of friction cones mounted upon the driven shaft and adapted to engage the inner friction surfaces of each of said disks upon opposite sides of said disks, and a friction cone slidably mounted upon the driving shaft and adapted to be brought into engagement with the outer faces of each of the disks simultaneously.

9. In a power transmission device, the combination with a driven shaft, of a driving shaft, a pair of friction disks mounted upon each side of the driven shaft and having inner and outer friction surfaces, a small cone slidably mounted upon the driving shaft and adapted to be brought into engagement with the outer friction surfaces of the disks simultaneously, a pair of cones larger than the first named cone and mounted to rotate with the driven shaft, and means for bringing either of said larger cones into engagement with the inner friction surfaces of the disks.

In testimony whereof I affix my signature in presence of two witnesses.

JONATHAN U. BAKER.

Witnesses:
A. L. PHELPS,
L. CARL STOUGHTON.